Jan. 8, 1963 E. C. HOFFMAN 3,072,036
INDICATORS FOR PHOTOGRAPHIC CAMERAS
Filed Jan. 21, 1960 2 Sheets-Sheet 1
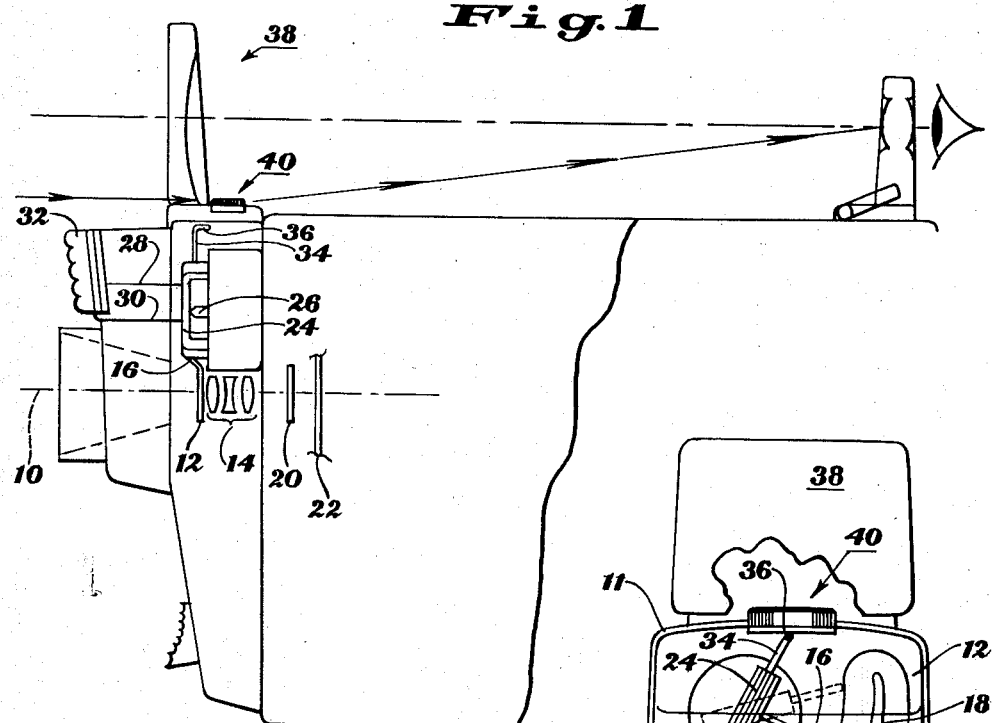
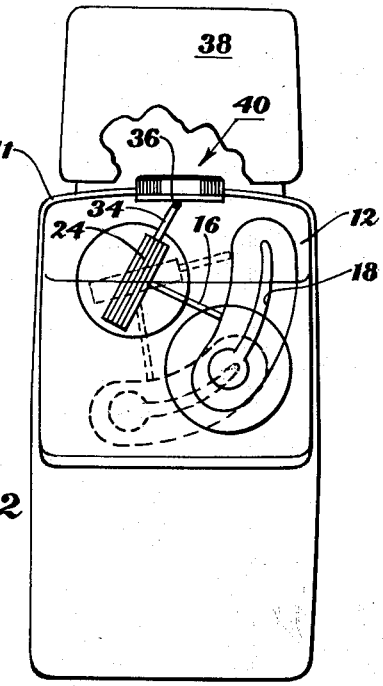
Edwin C. Hoffman
INVENTOR.
BY R. Frank Smith
Robert W. Hampton
ATTORNEYS Jan. 8, 1963 E. C. HOFFMAN 3,072,036
INDICATORS FOR PHOTOGRAPHIC CAMERAS
Filed Jan. 21, 1960 2 Sheets-Sheet 2
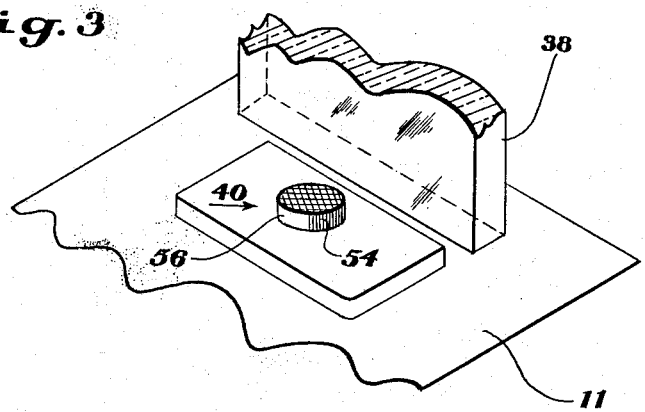
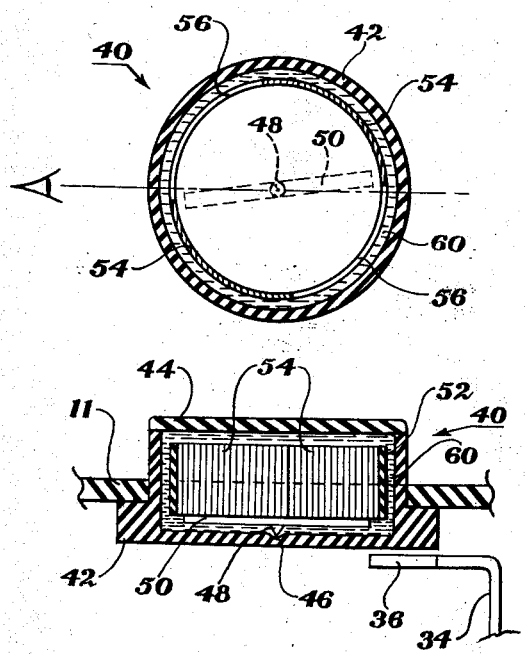
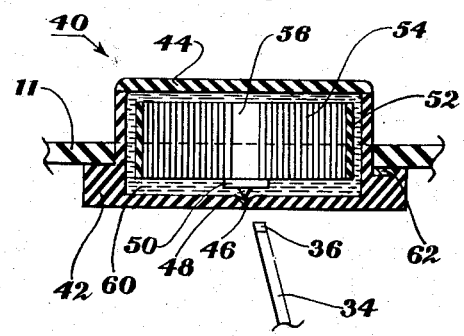
Edwin C. Hoffman
INVENTOR.
BY R. Frank Smith
Robert W. Hampton
ATTORNEYS

United States Patent Office 3,072,036
Patented Jan. 8, 1963

3,072,036
INDICATORS FOR PHOTOGRAPHIC CAMERAS
Edwin C. Hoffman, Rochester, N.Y., assignor to Eastman Kodak Company, Rochester, N.Y., a corporation of New Jersey
Filed Jan. 21, 1960, Ser. No. 3,850
5 Claims. (Cl. 95—64)

The present invention relates to photographic cameras having automatic exposure control systems, and more particularly relates to means for indicating low scene brightness in such cameras.

It is convenient for the operator of a motion picture camera, which has an automatic exposure control system, to be warned when scene brightness drops below the range for which the camera is designed. Numerous devices have been proposed for presenting a low-light signal to the camera operator in such cases. However, signals of this type generally have been illuminated by scene light, the intensity of which has been diminished by piping or multiply reflecting the light into the viewfinder from a position within the body of the camera, where the control mechanism is conveniently located. Other devices, which have interposed a signalling device directly in the viewfinder, under control of the remote exposure control mechanism, have imposed impractical loads on the latter.

It is therefore a primary object of the present invention to warn the operator of a camera, which has an automatic exposure control system, when the scene brightness is less than a predetermined value, by means of a visual viewfinder signal that employs direct scene light for illumination.

It is a more particular object of the invention to magnetically couple a part of the automatic exposure control system of a camera to a signalling device in the viewfinder of the camera for warning the camera operator when scene brightness is less than a predetermined value.

Other objects of the invention will appear from the following description, reference being made to the accompanying drawings, wherein:

FIG. 1 is a schematic right side view of the basic elements of a motion picture camera embodying one form of the present invention;

FIG. 2 is a front view of the diaphragm vane and signal mechanism illustrated in FIG. 1;

FIG. 3 is an isometric view of a portion of the viewfinder and signal mechanism;

FIG. 4 is an enlarged top view of the signal mechanism;

FIG. 5 is an enlarged right side view of the signal mechanism; and

FIG. 6 is an enlarged rear view of the signal mechanism.

Referring to FIG. 1, a typical camera embodying the invention has a taking-lens axis 10 on which are arranged a diaphragm vane 12, a taking-lens system indicated generally at 14, a shutter 20 and a photosensitive surface such as a filmstrip 22. Referring also to FIG. 2, the diaphragm vane may be formed as an arcuate disk having a tapered, curved aperture 18, which moves in a path crossing the lens axis 10 for establishing an exposure aperture whose area is a function of the angular position of the diaphragm vane. The diaphragm vane may be positioned automatically, in a manner well known in the art, by means of galvanometer coil 24, which is connected to and rotates the diaphragm by means of an arm 16. Coil 24 pivots about an axis 26 and is connected by a pair of leads 28 and 30 to a photocell 32, which is disposed for illumination by scene light. In response to variations in scene brightness, photocell 32 variably energizes coil 24 and thereby causes the coil to move angularly about axis 26 for establishing an angular position of the diaphragm vane 12 and aperture 18 corresponding to scene brightness. The structure and operation of the galvanometer and photocell are well known in the art and may be of the type disclosed in U.S. Patent 2,509,893, granted May 30, 1950, to C. F. Taylor et al.

Although the drawings illustrate a motion picture camera wherein the exposure is automatically controlled by positioning a diaphragm vane, it will be understood that the invention had equal utility in conjunction with other forms of automatic exposure control, e.g., in still or motion picture cameras wherein shutter speed is automatically controlled instead of or in addition to diaphragm opening.

An arm 34, which is secured to and moves with the galvanometer coil 24, has a turned end carrying a permanent magnet 36. This magnet cooperates with a signal device 40, which is located in the viewfinder 38 of the camera, to provide a visual signal in the viewfinder, indicating at all times the presence or absence of sufficient scene light for normal photography.

Referring particularly to FIGS. 3–6, the signal device 40 comprises a cylindrical base member 42 formed of transparent nonmagnetic material and cemented or otherwise secured to a cover or frame member 11 of the camera, which separates the camera body from the viewfinder. A disk shaped cap 44 is secured to and encloses the top of the cylindrical member 42 and may be formed of opaque nonmagnetic material. A conical recess 46 in the inner surface of the base of member 42 is adapted to receive a conical pivot post 48, which is integral with a permanent magnet 50. This magnet is secured to the bottom of a cylinder 52 formed of transparent nonmagnetic material.

The periphery of cylinder 52 has four evenly spaced signal quadrants. The first two quadrants, diametrically opposed to each other, are painted or dyed an identifying color, such as red, and are indicated in FIGS. 4–6 at 54. The alternate quadrants 56 are shown as uncolored, but may be any other color contrasted with quadrants 54 and should be light-transmitting, preferably transparent. Cylinder 52 is suspended inside the hollow casing formed by members 42 and 44 in a light-transmitting, preferably transparent liquid 60 such as glycerin. A permanent magnet 62 is fixed relative to the camera frame or cover member 11, preferably in a suitably shaped slot between the abutting surfaces of member 42 and frame 11, as shown in FIG. 6.

Magnet 62 provides a fixed field, which normally maintains magnet 50 and cylinder 52 in a predetermined alignment. When the galvanometer coil 24 (see also FIG. 2) is in a position such that the minimum width of diaphragm aperture 18 is aligned with the taking lens axis, i.e., the galvanometer is in a state of maximum energization as a result of maximum scene brightness, arm 34 holds magnet 36 in such position that its influence on magnet 50, coupled with the influence of magnet 62, holds cylinder 52 in a position so that the centers of the light-transmitting quadrants 56 are substantially aligned with the axis of the viewfinder, which is parallel to the lens axis 10. In this condition, a beam of scene light of maximum width reaches the viewer's eye through cylinder 52. As the energization of the galvanometer coil decreases in response to reduced scene brightness, magnet 36 is moved by arm 34 to a new position, where, in conjunction with the magnet 62, it rotates magnet 50 and cylinder 52 to a position with quadrants 54 and 56 of that cylinder overlapping on the viewfinder axis. In this position of cylinder 52 the width of the light-transmitting area visible in the viewfinder through cylinder 52 is diminished, as illustrated in FIG. 6. When the galvanometer coil rotates to a position wherein the maximum width of aperture 18 is aligned with the taking lens axis, i.e., scene brightness is diminished to the threshold value for which the camera is designed, the magnet 36, along with the magnet 62, rotates magnet 50 and cylinder 52 to a position such that the colored or opaque quadrants 54 completely color or block the scene light as seen by the camera operator through cylinder 52, thereby warning the operator of the low scene brightness.

The invention has been described in detail with particular reference to a preferred embodiment thereof, but it will be understood that variations and modifications can be effected within the spirit and scope of the invention as described hereinabove and as defined in the appended claims.

I claim:

1. In a camera having a viewfinder and an automatic exposure control system including a member moving as a function of scene brightness to regulate the exposure of film in said camera, the combination comprising: a first magnetic element connected to said member and moved therewith; a movable signal device visible through said viewfinder; said signal device being pivotally mounted and balanced to move freely about said pivotal mounting and being mechanically isolated from said member; a second magnetic element connected to said signal device and magnetically coupled to said first magnetic element for positioning said signal device as a function of the position of said member and therefore as a function of scene brightness.

2. The combination defined in claim 1, wherein said moving member comprises a diaphragm vane.

3. The combination defined in claim 1, wherein said signal device includes a pivotally mounted cylinder having a periphery comprising successive quadrants with contrasting light transmitting properties, each of said quadrants having substantially the same light transmitting properties as its diametrically opposed quadrant.

4. The combination defined in claim 3, with: a hollow sealed container enclosing said cylinder and formed of light-transmitting material, said container being adapted to hold a light-transmitting liquid in which said cylinder is suspended.

5. The combination defined in claim 1 with a permanent magnet fixed to said camera and establishing a reference magnetic field for applying a predetermined bias to said second magnetic element.

References Cited in the file of this patent

UNITED STATES PATENTS

| | | |
|---|---|---|
| 2,058,532 | Tuttle | Oct. 27, 1936 |
| 2,358,084 | Mihalyi | Sept. 12, 1944 |
| 2,339,860 | Dimmick | May 7, 1946 |
| 2,995,996 | Gossen | Aug. 15, 1961 |

FOREIGN PATENTS

| | | |
|---|---|---|
| 145,699 | Austria | May 11, 1936 |